May 21, 1929.    M. F. BATES    1,713,942

METHOD AND APPARATUS FOR CONTROLLING PENDULOUSLY SUPPORTED BODIES

Filed May 16, 1923

Inventor
Mortimer F. Bates
By his Attorney
Herbert H. Thompson

Patented May 21, 1929.

1,713,942

UNITED STATES PATENT OFFICE.

MORTIMER F. BATES, OF BROOKLYN, NEW YORK, ASSIGNOR, BY MESNE ASSIGNMENTS, TO SPERRY GYROSCOPE COMPANY, INC., A CORPORATION OF NEW YORK.

METHOD AND APPARATUS FOR CONTROLLING PENDULOUSLY-SUPPORTED BODIES.

Application filed May 16, 1923. Serial No. 639,274.

This invention embraces a method and apparatus for controlling a pendulous body and it aims at and effects a better damping of the oscillations of such a body than has heretofore been accomplished. More specifically, it has reference to damping the oscillations of pendulous gyroscopic compasses and other gyroscopic apparatus.

As is well known, gyroscopic compasses and other gyroscopic apparatus are supported in gimbal or Cardan rings. While I shall refer to apparatus of this character for the purpose of illustrating my invention, it is to be understood that it may be applied to any apparatus supported so as to be free to swing in one or more directions. Also, while I may describe the invention as being employed on a ship, it may apply equally as well to any other type of carrier.

An object of the present invention is to provide a novel method and means for damping bodies supported in Cardan mountings, which while normally acting as a cushion to hold the pendulous body in its normal position, releases the same in response to the slightest tilt about the axes of the Cardan mounting, and upon reaching the limit of this tilting motion in a given direction, reassumes its former position, thereby effectively damping the pendulous body.

My invention will be better understood from the following description taken in connection with the accompanying drawings and its scope will be pointed out in the appended claims.

Figure 1:
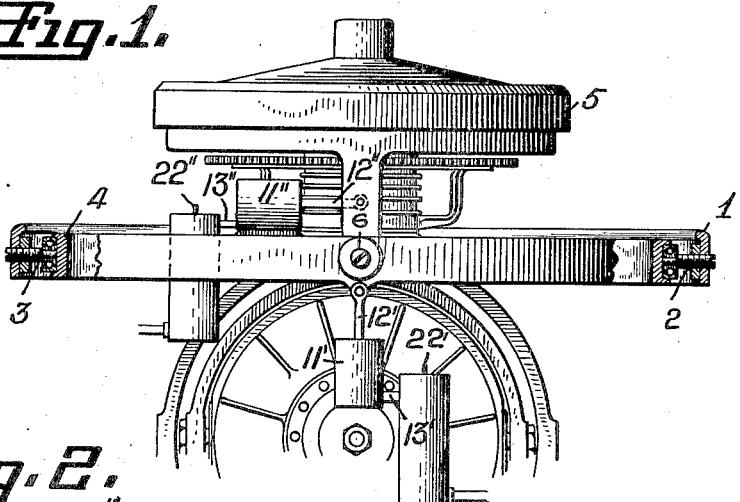
Figure 2:
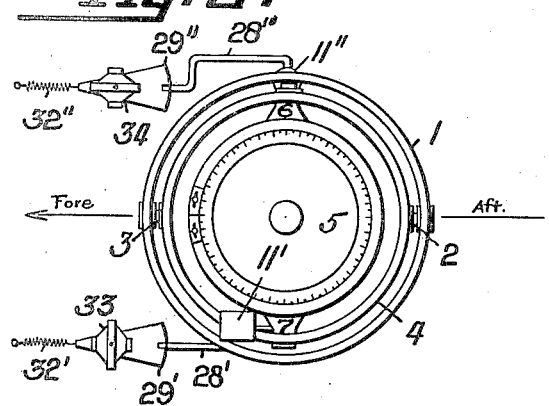
Figure 3:
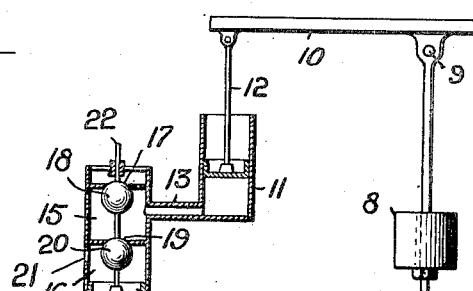
Figure 4:
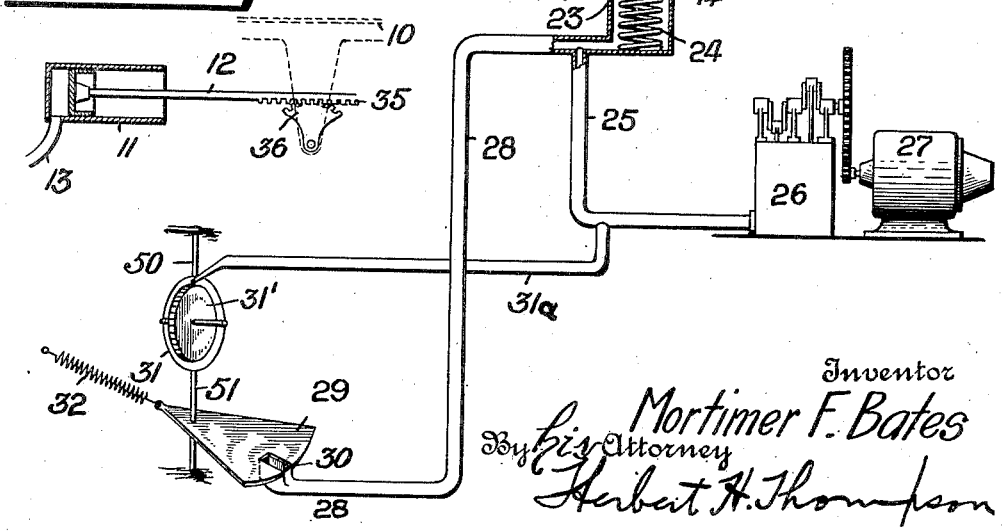

In the drawings illustrating what I now consider the preferred form of my invention, Fig. 1 is a front elevation of a gyro-compass with parts broken away, embodying my invention, Fig. 2 is a top view of a gyro-compass illustrating the position of the damping means and controlling gyros therefor, Fig. 3 is a diagram of one system of control with the damping means shown in section, and Fig. 4 is a view, partly in section, of a modified form of the damping means.

Referring to the drawings, the numeral 1 indicates the binnacle ring, in which is supported on horizontal pivots 2, 3, a gimbal ring 4. On this ring is supported a gyroscopic compass unit 5, which is pivoted at 6, 7, in a plane at right angles to the pivots 2, 3, thus constituting a Cardan mounting for the gyroscopic compass unit. It is of course understood that the compass or other unit could be supported by two gimbal rings pivoted at right angles to each other within the binnacle ring. Such a mounting is shown in the pending application of Preston R. Bassett, Serial No. 630,034, filed April 5, 1923, which application is assigned to the assignee of the present invention.

As above indicated, this invention aims to counter-act the acceleration forces on the supported unit about its supporting axes, that is, pivots 2, 3 and pivots 6, 7, for example, in the case illustrated where the unit is on board ship, the acceleration force on the gyro-compass unit due to the roll and pitch of the ship.

In carrying out my invention, I provide for each of the axes to be controlled, a dashpot which is controlled by a gyroscopically controlled valve. Such a system is shown in Fig. 3, in which the numeral 8 represents the pendulum to be controlled. This pendulum is shown pivoted at 9 to swing in the plane of the paper, and may be a gyroscopic compass unit 5 or any other pendulous body. An arm 10 is rigidly secured to the pendulum 8, to move therewith. A dashpot is shown at 11, the stem 12 of which is pivotally secured to the arm 10. The air chamber of the dashpot is connected by a passage 13 to a balanced control valve 14, which may be of any standard type. Preferably, this valve is provided with two chambers 15, 16, the passage 13 communicating with chamber 15. The chamber 15 is provided with a port 17 leading to the open, which port is controlled by ball 18. The chamber 15 is also provided with a second port 19, communicating with chamber 16, which port is controlled by a ball 20, within chamber 16. Chamber 16 is also provided with a port 21 leading to atmosphere. The balls 18 and 20 are preferably carried on a stem 22, which stem is secured to a piston 23 located within the lower portion of chamber 16 as shown. The piston 23 is normally urged by a spring 24 in a direction to cause the balls 18 and 20 to seat on ports 17 and 19 and close the communication of chamber 15 and passage 13 to the atmosphere. Therefore, in this position, the dashpot 11 has a very limited movement, cushioning the pendulum 8 and damping the pendulosity thereof in a manner readily understood.

However, in order to maintain the arm 10 in a horizontal position, that is, to permit the pendulum 8 to assume its normal position when acted upon by gravitational forces, a gyroscopic control has been provided for the valve 14. For this purpose I preferably employ a gyroscope of the type shown in U. S. Letters Patent No. 1,407,491, dated February 21, 1922 to Elmer A. Sperry. In this type of gyroscope, the rotor is air driven by either negative or positive pressure. The axes about which the gyroscope is mounted, however, are different in the present instance, the gyroscope being mounted to precess upon oscillation of the support about a horizontal axis. As shown in Fig. 3, the lower part of chamber 16 is connected by a passage 25 with a pump 26, driven by a motor 27. This chamber is also provided with an open-ended passage 28. The pressure of pump 26 may be positive or negative, and for the purpose of illustrating my invention, I have shown it as a vacuum pump. It is therefore clear that the movement of piston 23, and with it the balls 18 and 20, may be controlled by the opening and closing of the end of passage 28. Thus, when passage 28 is open, the communication of chamber 15 and passage 13 with the atmosphere is closed, but when passage 28 is closed, the atmospheric pressure overcomes spring 24, moving piston 23 downwardly and of course, connecting chamber 15 with the atmosphere, thereby leaving pendulum 8 free to swing.

The open end of passage 28 is controlled by a blade 29, having a slot 30. This blade is fixed to the rotor bearing ring or casing 31 of a gyroscope 31' of the type mentioned, in which the rotor is mounted on a horizontal spinning axis in said ring. Ring 31 is in turn mounted for turning about a vertical axis, as by having connected thereto vertical trunnions 50, 51 journalled in a fixed support. Blade 29 is shown as secured to the lower trunnion 51. It is of course understood that any other type of gyroscope could be used, but with this type the pump 26 may be used to drive the rotor by connecting the unit enclosing the gyro with the pump 26 by a passage 31ª as shown. In its normal position, the slot 30 is over the open end of passage 28, and may be centralized by a spring 32 with an adjustment for tension. In accordance with well known gyroscopic phenomena, a tilt about the axis of said unit to be controlled, will cause a precession of the gyroscope, thereby moving the blade 29 and closing passage 28, leaving the pendulum 8 free to follow. But as soon as the pendulum has reached its center of gravity and the unit is in a horizontal position, the vertical ring assumes its normal position with respect to the rotor and the blade 29 has been restored to its normal position with slot 30 over passage 28. It will thus be seen that the instant the controlled unit, or arm 10 in this case, reaches a horizontal position, its further movement is damped by dashpot 11, and that when it has been tilted from such position, it is free to move until it has again resumed the horizontal position.

Applying my invention specifically to a gyroscopic compass on board ship, as shown in Fig. 2, the gimbal ring 4 is pivoted on the fore and aft line of the ship and the gyroscopic compass unit is pivoted at right angles to said line. The stem 12' of a dashpot 11', as shown in Fig. 1, is suitably secured to the gyro unit 5, and a dashpot 11'' is secured in a similar manner to the ring 4. Obviously, any tilt due to the pitch of the ship is about pivots 6, 7. The dashpots 11' and 11'' are provided with valves and connections similar to those shown in Fig. 3, the respective passages 28', 28'' and blades 29', 29'' alone being visible in Fig. 2. The blades 29' and 29'' are respectively controlled by gyroscopes 33 and 34, which are similar to the gyroscope 31' shown in Fig. 3. Since the gyroscopes 33 and 34 must control movements in planes at right angles to each other, their rotors are mounted in planes at right angles to each other. For example, since the gyroscope 33 is to damp oscillations due to the pitching of the ship, it is mounted with its spinning axes parallel to the fore and aft line of the ship. Likewise, the gyroscope 34, for damping oscillations due to the roll of the ship, is mounted with its spinning axis athwartship. The operation is similar to that described in connection with Fig. 3.

In Figure 4 is shown a modified form of connecting the stem 12 of dashpot 11 with the arm 10, or the proper units in Fig. 2. In this form, the stem 12 is provided with a plurality of teeth 35, arranged to mesh with a segmental gear 36, which is fixed to the arm 10 in Fig. 3, or the ring 4 or unit 5 in Figs. 1 and 2.

Briefly stated, therefore, the operation of my invention is as follows: A pendulous body is freely suspended from a support so that normally if the support rotated merely about the axis or axes of support, the pendulous body would be unaffected. If tilting of the support occurs about any other axis then it will be appreciated that after the tilting movement has ceased, the acceleration forces will cause the pendulous body to continue its movement and it is this latter movement that it is the function of the invention to damp. It is desirable that the pendulum hang freely during the tilting movements of the support, but that as soon as said movements cease, damping means should become effective to prevent further movement of the pendulous body. Therefore, the two gyros 33 and 34 detect any tilting movements of the support and respond thereto and such response renders the dashpots ineffective for damping the movement of the pendulous body. As soon, however, as the tilting movements of the support cease, the sensitive gyros 33—34 are returned to neutral position and the dashpots immediately become effective to damp any movements of the pendulous body which might otherwise take place after the tilting movements of the support ceased. The tension of springs 32′—32″ may be so adjusted that the damping means is not rendered ineffective until the tilting movements of the support attain a certain predetermined velocity so that for the major portion of the tilting movements the damping means, that is the dashpot, would be rendered ineffective but for a predetermined portion of the tilting movements the dashpot would again be rendered effective. Stated another way, this means that the damping means would be rendered ineffective during the portion of relatively high velocity of tilting movement and again rendered effective during the portion of relatively low velocity of tilting movement. The predetermined tension of springs 32′ and 32″ would determine the said relative portions.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. An apparatus for damping the oscillations of a universally supported instrument, the combination with the universally supported instrument, of a retarding device connected with said instrument, means for rendering said device effective or ineffective, and means for controlling said first-named means including a gyroscope and a governing mechanism for said retarding device controlled by said gyroscope.

2. Apparatus for damping the oscillations of a pendulous device adapted to be mounted on a body subject to oscillation comprising a dashpot acted upon by said device, a valve for rendering said dashpot effective and ineffective, and means for controlling said valve including means responsive to oscillations of the body on which the device is mounted.

3. Apparatus for counter-acting acceleration forces on a pendulous body in a given plane comprising a dashpot connected with said body, a valve for rendering said dashpot effective or ineffective and a gyroscope responsive to motion in the same plane for controlling said valve.

4. Apparatus for damping the oscillations of a pendulous device adapted to be mounted on a body subject to oscillation comprising a dashpot connected with said device, a valve for rendering said dashpot effective or ineffective, a pressure system for moving said valve, and means responsive to the oscillations of the body on which the device is mounted for controlling said system.

5. Apparatus for damping the oscillations of a pendulous body comprising a dashpot connected with said body, a valve for rendering said dashpot effective or ineffective, means normally closing said valve, a pressure system controlling said latter means, and means responsive to the tilting of said body for controlling said pressure system.

6. Apparatus for damping the oscillations of a pendulous body comprising a dashpot connected with said body, a valve for rendering said dashpot effective or ineffective and having a piston, means normally closing said valve, a pressure source for actuating said piston to open said valve, and means responsive to changes in the position of said pendulous body for controlling said pressure source.

7. Apparatus for damping the oscillations of a pendulous body comprising a dashpot connected with said body, a valve for rendering said dashpot effective or ineffective, means normally closing said valve, a pressure source for controlling said means, and gyroscopically controlled means for controlling said pressure source.

8. Apparatus for damping the oscillations of a pendulous body comprising a dashpot connected with said body, a valve for rendering said dashpot effective or ineffective and having a piston, means normally closing said valve, a pressure source for actuating said piston to open said valve, and gyroscopically controlled means for controlling said pressure source.

9. Apparatus for damping the oscillations of a pendulous body comprising a dashpot connected with said body, a valve for rendering said dashpot effective or ineffective, means normally closing said valve, a pressure system for controlling said means, means controlling said pressure system, and a gyroscope driven by said pressure system for controlling the latter means.

10. Apparatus for damping the oscillations of a pendulous body comprising a dashpot connected with said body, a valve for rendering said dashpot effective or ineffective and having a piston, means normally closing said valve, a pressure system for actuating said piston to open said valve, means controlling said pressure system, and a gyroscope driven by said pressure system for controlling the latter means.

11. Apparatus for damping the oscillations of a pendulous body in a given plane comprising a dashpot connected with said body, a valve for rendering said dashpot effective or ineffective and normally closed, a pressure system for controlling said valve, means controlling said system, and a gyroscope responsive to tilting in said plane for controlling said means.

12. Apparatus for damping the oscillations of a pendulous body in a given plane comprising a dashpot connected with said body, a valve for rendering said dashpot effective or ineffective, means normally closing said valve, a pressure system for controlling said means, means controlling said pressure system, and a gyroscope responsive to tilting in said plane driven from said pressure system for controlling the latter means.

13. Apparatus for damping the oscillations of a pendulous body in a given plane comprising a dashpot connected with said body, a valve for rendering said dashpot effective or ineffective and having a piston, means normally closing said valve, a pressure system for actuating said piston to open said valve, means controlling said pressure system and a gyroscope responsive to tilting in said plane for controlling the latter means.

14. Apparatus for damping the oscillations of a pendulous body in a given plane comprising a dashpot connected with said body, a valve for rendering said dashpot effective or ineffective and having a piston, means normally closing said valve, a pressure system for actuating said piston to open said valve, means controlling said pressure system, and a gyroscope responsive to tilting in said plane driven by said pressure system for controlling the latter means.

15. In combination, a gyroscopic compass, a Cardan mounting therefor, a retarding device adapted to act upon each axis of said mounting, a gyroscope responsive to oscillation of the ship, and means governed by said gyroscope for controlling said devices.

16. In combination, a gyroscopic compass, a Cardan mounting therefore, dashpots adapted to control each axis of said mounting, and gyroscopic means responsive to tilting about said axes respectively for controlling said dashpots.

17. The combination with a gyroscopic compass having a Cardan mounting, of means for damping the acceleration of said compass about the axes of said mounting comprising retarding devices adapted to act upon said axes, means for rendering said devices effective or ineffective, and an auxiliary gyroscope mounted independently of said compass for controlling said last-named means.

18. The combination with a gyroscopic compass having a Cardan mounting, of means for damping the acceleration of said compass about the axes of said mounting comprising dashpots adapted to act upon each of said axes, means for rendering said dash-pots effective or ineffective, and an independently mounted gyroscope for governing said means.

19. The combination with a gyroscopic compass having a Cardan mounting, of means for damping the acceleration of said compass about the axes of said mounting comprising for each axis a dash-pot adapted to control tilting about the respective axis, valves for rendering the dash-pots effective or ineffective, and a gyroscope mounted for precession on rolling or pitching of the ship for controlling said valves.

20. The combination with a gyroscopic compass having a Cardan mounting, of means for damping the acceleration of said compass about the axes of said mounting comprising for each axis a dashpot adapted to control tilting about the respective axis, valves for rendering the dashpots effective or ineffective and a gyroscope responsive to tilting about the same axis for controlling said valves.

21. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective, a pressure system for moving said valves and a gyroscope for controlling said system.

22. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective, means normally closing each of said valves, a pressure system controlling said latter means, and means responsive to tilting about said axis for controlling said pressure system.

23. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective and each having a piston, means normally closing each of said valves, a pressure source for actuating said pistons to open said valves, and a gyroscope mounted for precession on rolling or pitching of the ship for controlling said pressure source.

24. The combination with a gyroscope compass having a Cardan mounting, of means for damping the acceleration of said compass about the axes of said mounting comprising for each axis a dashpot adapted to control tilting about the respective axis, valves for rendering said dashpots effective or ineffective, means normally closing said valves, a pressure system for rendering said means effective or ineffective, means controlling said pressure system, and a gyroscope driven by said pressure system for controlling the latter means.

25. The combination with a gyroscope compass having a Cardan mounting, of means for damping the acceleration of said compass about the axes of said mounting comprising for each axis a dashpot adapted to control tilting about the respective axis, valves for rendering said dashpots effective or ineffective and each having a piston, means normally closing said valves, a pressure system for actuating said pistons to open said valves, means controlling said pressure system, and a gyroscope driven by said pressure system for controlling the latter means.

26. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective, and being normally closed, a pressure system for controlling said valves and a gyroscope responsive to tilting about the same axis for controlling said system.

27. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective and being normally closed, a pressure system for controlling said valves and a gyroscope responsive to tilting about the same axis driven from said system for controlling said system.

28. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective, said valves being normally closed and each having a piston, a pressure system acting upon said pistons, and a gyroscope responsive to tilting about the same axis for controlling said system.

29. The combination with a gyroscopic compass having a Cardan mounting, of means for damping the acceleration of said compass about the axes of said mounting comprising for each axis a dashpot adapted to control tilting about the respective axis, valves for rendering said dashpots effective or ineffective, said valves being normally closed, and each having a piston, a pressure system acting upon said pistons, and means controlling said system including a gyroscope responsive to tilting about the same axis driven from said system.

30. In combination, a pendulous body having a universal support therefor, means for damping the oscillations of said body, and means whereby said first means is rendered ineffective during the tilting movement of said support and rendered effective as soon as said movement ceases.

31. In combination, a pendulous body having a universal support therefor, means for damping the oscillations of said body, and means, including means responsive to tilting movements of said support, whereby said first means is rendered ineffective during the tilting movement of said support and rendered effective as soon as said movement ceases.

32. In combination, a pendulous body having a universal support therefor, means for damping the oscillations of said body, and means whereby said first means is rendered ineffective during the portion of relatively high velocity of said oscillations and effective during the portion of relatively low velocity of said oscillations.

In testimony whereof I have affixed my signature.

MORTIMER F. BATES.